United States Patent
Wakamiya

(10) Patent No.: US 10,136,070 B2
(45) Date of Patent: Nov. 20, 2018

(54) IMAGE CAPTURING APPARATUS AND CONTROL METHOD OF THE SAME

(71) Applicant: CANON KABUSHIKI KAISHA, Tokyo (JP)

(72) Inventor: Daisuke Wakamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 14/939,129

(22) Filed: Nov. 12, 2015

(65) Prior Publication Data

US 2016/0142641 A1    May 19, 2016

(30) Foreign Application Priority Data

Nov. 13, 2014   (JP) .................................. 2014-231049

(51) Int. Cl.
   *H04N 5/225*   (2006.01)
   *H04N 5/232*   (2006.01)
   *H04N 5/06*    (2006.01)

(52) U.S. Cl.
   CPC ..... *H04N 5/23296* (2013.01); *H04N 5/23293* (2013.01); *H04N 5/06* (2013.01)

(58) Field of Classification Search
   CPC .... G06F 2203/04806; G09G 2320/068; G09G 2340/045; H04N 3/1562; H04N 5/23296; H04N 5/3454; H04N 5/3456
   See application file for complete search history.

(56) References Cited

U.S. PATENT DOCUMENTS

| | | | | |
|---|---|---|---|---|
| 2001/0024234 | A1* | 9/2001 | Kubo | H04N 3/1562 348/224.1 |
| 2004/0109067 | A1* | 6/2004 | Yokoi | H04N 5/23203 348/220.1 |
| 2004/0252206 | A1* | 12/2004 | Tsumura | H04N 5/772 348/231.99 |
| 2006/0114334 | A1* | 6/2006 | Watanabe | H04N 5/232 348/222.1 |
| 2007/0098386 | A1* | 5/2007 | Yoneda | H04N 5/232 396/60 |
| 2007/0211153 | A1* | 9/2007 | Uchida | H04N 5/23293 348/231.99 |
| 2008/0002036 | A1* | 1/2008 | Ohwa | H04N 3/1562 348/222.1 |

(Continued)

FOREIGN PATENT DOCUMENTS

| | | |
|---|---|---|
| JP | 2003-323333 A | 11/2003 |
| JP | 2012-222643 A | 11/2012 |

*Primary Examiner* — Twyler L Haskins
*Assistant Examiner* — Dwight Alex C Tejano
(74) *Attorney, Agent, or Firm* — Cowan, Liebowitz & Latman, P.C.

(57) ABSTRACT

An image capturing apparatus comprises an image capturing unit, a memory configured to store image data that is output at a predetermined framerate from the image capturing unit, a write unit configured to write the image data to the memory, a readout unit configured to read out the image data stored in the memory, a display unit configured to display an image based on the image data read out by the readout unit, and a control unit configured to control reading out of the image data by the readout unit, wherein the control unit performs control such that a frame of image data read out by the readout unit differs between when electronic zoom is operating and when electronic zoom is not operating.

13 Claims, 6 Drawing Sheets

(56) References Cited

U.S. PATENT DOCUMENTS

| | | | |
|---|---|---|---|
| 2008/0002038 A1* | 1/2008 | Suwa | H04N 5/23245 |
| | | | 348/229.1 |
| 2011/0007173 A1* | 1/2011 | Takenaka | H04N 3/1562 |
| | | | 348/222.1 |
| 2014/0240542 A1* | 8/2014 | Toguchi | H04N 5/23293 |
| | | | 348/231.99 |
| 2016/0021324 A1* | 1/2016 | Irie | H04N 5/23293 |
| | | | 348/333.12 |

* cited by examiner

FIG. 5

| WRITE IMAGE FRAME NUMBER | 0 | 1 | ... | 8 | 9 | 10 | 11 | |
|---|---|---|---|---|---|---|---|---|
| WRITE IMAGE MEMORY (VRAM 103A/B) | A | B | | A | B | A | B | |
| READOUT IMAGE FRAME NUMBER | 0 | 1 | ... | 8 | 9 | 9 | 10 | ... |
| READOUT IMAGE MEMORY (VRAM 103A/B) | A | B | | A | B | B | A | |
| IMAGE ENLARGEMENT RATIO | 1.0 | 1.0 | | 1.0 | 1.0 | 1.1 | 1.2 | |

FIG. 7

| WRITE IMAGE FRAME NUMBER | 0 | 1 | | 8 | 9 | 10 | 11 | 12 | |
|---|---|---|---|---|---|---|---|---|---|
| WRITE IMAGE MEMORY (VRAM 103A/B) | A | B | | A | B | A | B | A | |
| READOUT IMAGE FRAME NUMBER | 0 | 1 | ... | 8 | 9 | 9 | 10 | 11 | |
| READOUT IMAGE MEMORY (VRAM 103A/B) | A | B | | A | B | B | A | B | |
| IMAGE ENLARGEMENT RATIO | 1.0 | 1.1 | | 1.8 | 1.9 | 2.0 | 2.1 | 2.2 | |

FIG. 8

| WRITE IMAGE FRAME NUMBER | 0 | 1 | | 8 | 9 | 10 | 11 | 12 | |
|---|---|---|---|---|---|---|---|---|---|
| WRITE IMAGE MEMORY (VRAM 103A/B) | A | B | | A | B | A | B | A | |
| READOUT IMAGE FRAME NUMBER | -1 | 0 | ... | 7 | 8 | 10 | 11 | 12 | |
| READOUT IMAGE MEMORY (VRAM 103A/B) | B | A | | B | A | A | B | A | |
| IMAGE ENLARGEMENT RATIO | 2.5 | 2.4 | | 1.7 | 1.6 | 1.5 | 1.4 | 1.3 | |

IMAGE CAPTURING APPARATUS AND CONTROL METHOD OF THE SAME

BACKGROUND OF THE INVENTION

Field of the Invention

The present invention relates to a technique for controlling image display during electronic zoom.

Description of the Related Art

Conventionally, a technique has been proposed for solving the issue of display delay in which the timing of display is delayed relative to the timing of image capturing when a fast moving object or the like is displayed in real time, or when a moving image is shot (see Japanese Patent Laid-Open No. 2012-222643 and Japanese Patent Laid-Open No. 2003-323333).

In the above Japanese Patent Laid-Open No. 2012-222643, mitigation of display delay is realized by adjusting the timing of display, but in the case of shooting an object that temporally changes size, position, and the like, such as a fast moving object, if the framerate during display and recording changes, then there is the possibility of motion smoothness being inhibited and the imaged object appearing in an unnatural way.

Also, the technique in the above Japanese Patent Laid-Open No. 2003-323333 controls access to the memory by applying a delay amount such that the reading out of data does not overtake the writing of data with respect to the same memory, but there is the possibility that the timing of the readout will be delayed during electronic zoom. In other words, in the case in which a portion of an image is enlarged due to electronic zoom and is displayed, a portion of the image area written to the memory is cut out, and therefore if the writing and reading out of data is performed with respect to the same memory, there is a possibility that the timing of the readout will be delayed more than it is when electronic zoom is not performed. If this delay exceeds the delay amount set in the above Japanese Patent Laid-Open No. 2003-323333, there are cases in which the display delay amount becomes unstable, and the display delay increases if a delay amount is provided that exceeds that which is necessary to prevent the delay amount for display from becoming unstable.

SUMMARY OF THE INVENTION

The present invention has been made in consideration of the aforementioned issues, and realizes technique that can mitigate display delay during electronic zoom as well as stably display an image.

In order to solve the aforementioned problems, the present invention provides an image capturing apparatus comprising: an image capturing unit; a memory configured to store image data that is output at a predetermined framerate from the image capturing unit; a write unit configured to write the image data to the memory; a readout unit configured to read out the image data stored in the memory; a display unit configured to display an image based on the image data read out by the readout unit; and a control unit configured to control reading out of the image data by the readout unit, wherein the control unit performs control such that a frame of image data read out by the readout unit differs between when electronic zoom is operating and when electronic zoom is not operating.

In order to solve the aforementioned problems, the present invention provides an image capturing apparatus comprising: an image capturing unit; a memory configured to store image data that is output at a predetermined framerate from the image capturing unit; a write unit configured to write the image data to the memory; a readout unit configured to read out the image data stored in the memory; a display unit configured to display an image based on the image data read out by the readout unit; and a control unit configured to control reading out of the image data by the readout unit, wherein when electronic zoom is not operating, the control unit controls the readout unit such that reading out starts in a frame period that is the same as that of writing of the image data, and when electronic zoom is operating, the control unit controls the readout unit such that reading out starts after being delayed by at least one frame period from writing of the image data.

In order to solve the aforementioned problems, the present invention provides an image capturing apparatus comprising: an image capturing unit; a memory configured to store image data that is output at a predetermined framerate from the image capturing unit; a write unit configured to write the image data to the memory; a readout unit configured to read out the image data stored in the memory; a display unit configured to display an image based on the image data read out by the readout unit; and a control unit configured to control reading out of the image data by the reading out unit, wherein the control unit makes a frame of image data read out from the memory different in accordance with a zoom magnification and a zoom area position when electronic zoom is operating.

In order to solve the aforementioned problems, the present invention provides a control method of an image capturing apparatus which has an image capturing unit; a memory configured to store image data that is output at a predetermined framerate from the image capturing unit; a write unit configured to write the image data to the memory; a readout unit configured to read out the image data stored in the memory; and a display unit configured to display an image based on the image data read out by the readout unit, the method comprising: a control step of controlling reading out of the image data by the readout unit, wherein in the control step, reading out is controlled such that a frame of image data read out by the readout unit differs between when electronic zoom is operating and when electronic zoom is not operating.

In order to solve the aforementioned problems, the present invention provides a control method of an image capturing apparatus which has an image capturing unit; a memory configured to store image data that is output at a predetermined framerate from the image capturing unit; a write unit configured to write the image data to the memory; a readout unit configured to read out the image data stored in the memory; and a display unit configured to display an image based on the image data read out by the readout unit; the method comprising: a control step of controlling reading out of the image data by the readout unit, wherein in the control step, when electronic zoom is not operating, the readout unit is controlled such that reading out starts in a frame period that is the same as that of writing of the image data, and when electronic zoom is operating, the readout unit is controlled such that reading out starts after being delayed by at least one frame period from writing of the image data.

According to the present invention, display delay during electronic zoom can be mitigated and an image can be stably displayed.

Further features of the present invention will become apparent from the following description of exemplary embodiments (with reference to the attached drawings).

BRIEF DESCRIPTION OF THE DRAWINGS

FIG. 5 is a diagram showing a relationship between timing of reading out/writing of images and an image enlargement ratio during electronic zoom.

FIG. 7 is a diagram showing a relationship between timing of reading out/writing of images and an image enlargement ratio during zoom-in.

FIG. 8 is a diagram showing a relationship between timing of reading out/writing of images and an image enlargement ratio during zoom-out.

DESCRIPTION OF THE EMBODIMENTS

Figure 1:
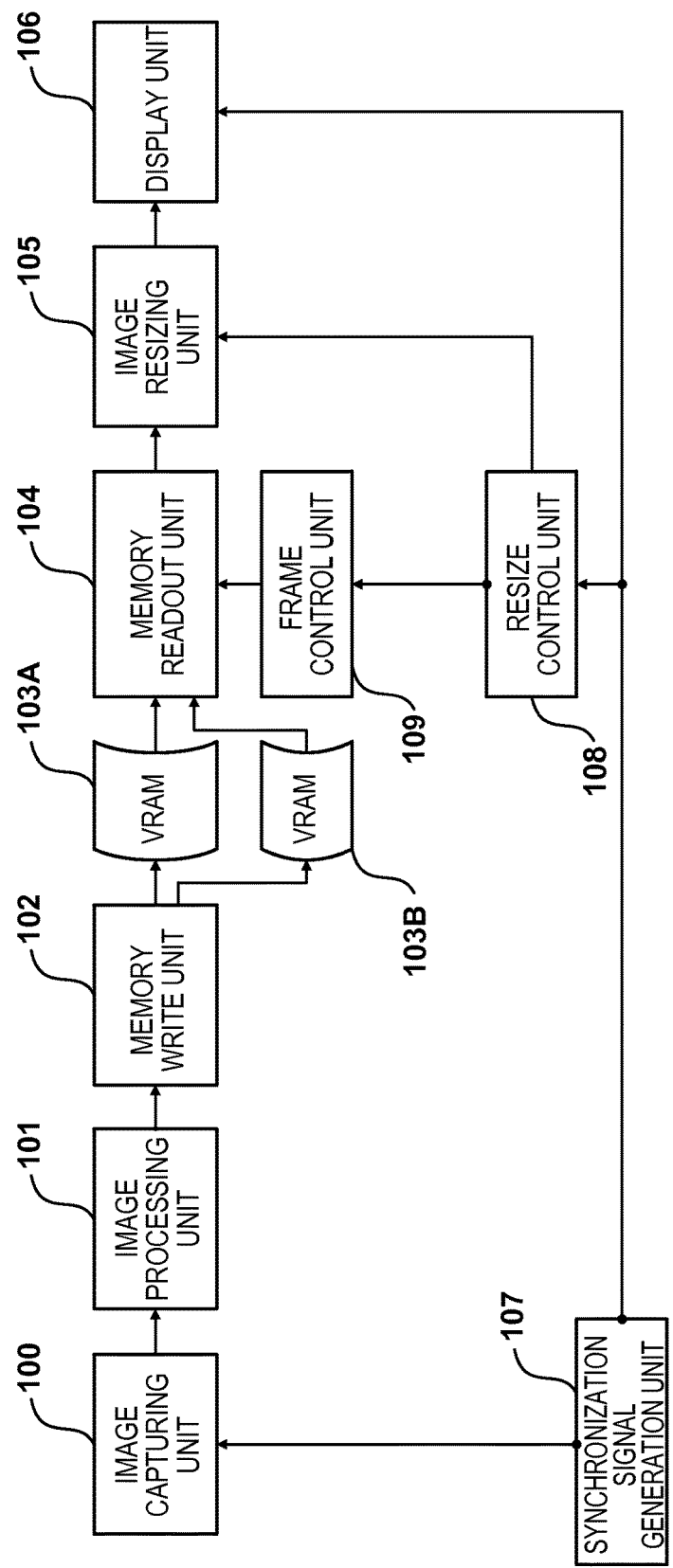
FIG. 1 is a block diagram showing a configuration of an apparatus according to an embodiment the present invention.

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The present invention is described below with embodiments that are applied to an image capturing apparatus such as a digital camera that can shoot still images or moving images. Note that the present invention can also be applied to an electronic device such as a smartphone or a tablet terminal.

Apparatus Configuration

An overview of the configuration and functions of the image capturing apparatus in the embodiments according to the present invention will be described with reference to FIG. 1.

An image capturing unit 100 is an image capturing element constituted by a CCD, a CMOS or the like that converts an object image, which is formed via an optical system including a lens, an aperture, and a shutter, into an electrical signal. The image capturing unit 100 includes an A/D converter that converts an analog signal output from the image capturing element into a digital signal.

An image processing unit 101 performs various types of image processing such as noise removal, gamma processing, interpolation processing, matrix conversion, compositing processing, and the like on image data output from the image capturing unit 100.

A memory write unit 102 writes image data, which has undergone image processing performed by the image processing unit 101, to image display memories VRAM 103A and 103B.

The VRAM 103A and 103B used in the present embodiment are volatile memories such as a DRAM onto which image data for display by a display unit 106 is rendered. Note that a non-volatile memory or another temporary storage apparatus may be used instead of a volatile memory, provided that data transmission is sufficiently fast.

The memory write unit 102 can write image data that corresponds to multiple frames worth to the VRAM 103A and 103B. In the present embodiment, for convenience of description, the memory write unit 102 alternatingly writes two frames worth of image data to the VRAM 103A and 103B.

A memory readout unit 104 reads out image data that was written to the VRAM 103A and 103B by the memory write unit 102.

An image resizing unit 105 performs enlargement processing on a specific area of image data that is read out by the memory readout unit 104.

The display unit 106 is made up of a display device such as an LCD panel or an organic EL panel, and performs image display based on image data that has undergone enlargement processing by the image resizing unit 105.

A synchronization signal generation unit 107 generates a synchronization signal that stipulates the framerate, and transmits the synchronization signal to the image capturing unit 100, the display unit 106, and to a resize control unit 108 and a frame control unit 109 that are described later. The framerate is a constant rate such as 30 fps or 60 fps that is stipulated based on a predetermined standard or the like.

In the case in which settings for electronic zoom magnification are changed by the user performing a zoom operation with a zoom lever (not shown) that is provided on the apparatus, the resize control unit 108 receives a synchronization signal that is transmitted by the synchronization signal generation unit 107, and determines the enlargement ratio and enlargement area for each framerate.

The frame control unit 109 controls the reading out of image data from the VRAM 103A and 103B by the memory readout unit 104 according to the enlargement ratio and enlargement area that were determined by the resize control unit 108.

Here, the relationship between the timing of image readout/writing and the timing of display when electronic zoom is not performed, will be described with reference to FIG. 2.

200 denotes an image area output from the image capturing unit 100 and written to the memory by the memory write unit 102. 201 denotes a write scan performed by the memory write unit 102, in which writing is performed using raster processing from the top end toward the bottom end. 210 denotes an image area read out by the memory readout unit 104. 211 denotes a readout scan performed by the memory readout unit 104, in which raster processing is performed similarly as it is in the write scan 201. 220 denotes an image area displayed by the display unit 106. In the present embodiment, it is assumed that the size of the display image 220 is the same size as that of the image area 210 of the readout scan 211. 221 denotes a display scan performed by the display unit 106, in which raster processing is performed similarly as it is in the write scan 211.

Figure 2:
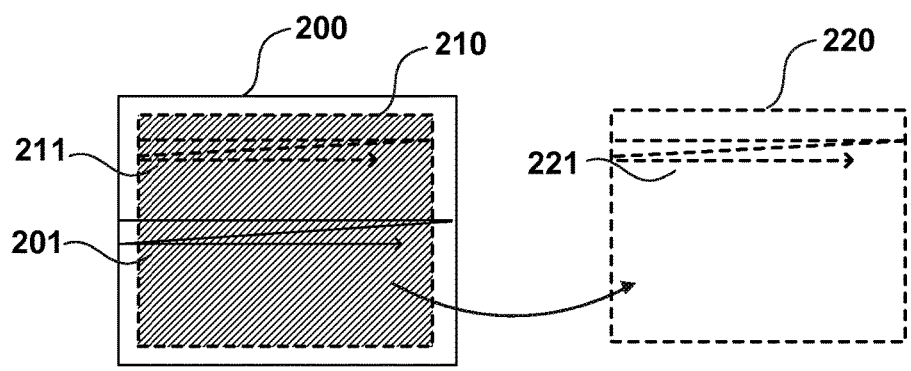
FIG. 2 is a diagram showing timing of image writing/reading out according to a first embodiment.

In FIG. 2, in the display scan 221, it is necessary to perform display processing at an image size and rate stipulated by the display device. The write scan 201 performs various processes with a timing that satisfies the rate of the display scan 221. In the case in which electronic zoom is not performed and the size of the display image 220 is the same as that of the image area 210 of the readout scan 211, the readout scan 201 and the display scan 221 can perform processing at the same rate. On the other hand, as will be described later with FIG. 3, writing is performed in accordance with the synchronization signal from the image capturing unit 100 (hereinafter "image capture synchronization signal"). In the case in which display processing is performed at a rate such as that of above, control is possible in which simultaneous access (readout and writing) to the same memory (VRAM) can be performed by applying a predetermined delay time and offsetting the timing of the write scan 201 and the readout scan 211.

Next, the timing of image readout/writing performed by the memory write unit 102 and the memory readout unit 104 of the present embodiment will be described with reference to FIGS. 3A and 3B.

Figure 3A:
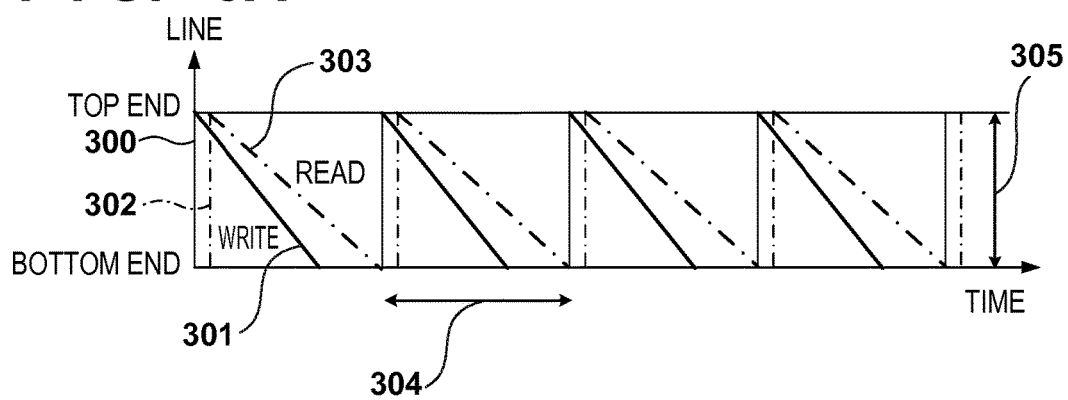
FIGS. 3A and 3B are timing charts showing writing/reading out of images when electronic zoom is not performed.
Figure 3B:
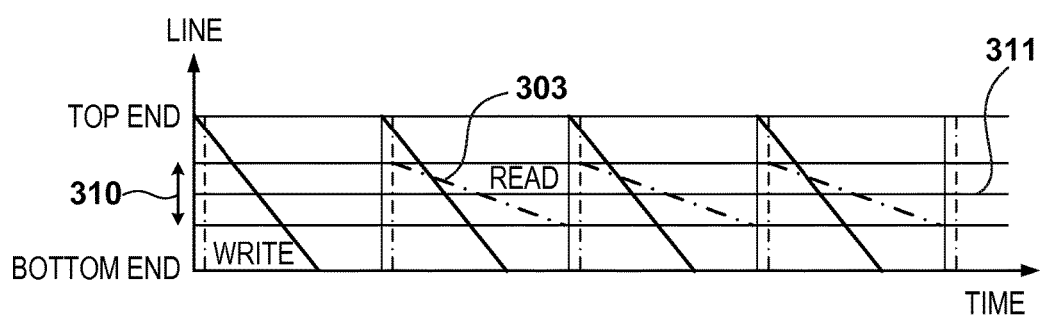

FIG. 3A shows the timing of image readout/writing when electronic zoom is not performed (normal zoom), and FIG. 3B shows the timing of image readout/writing during electronic zoom. Also, in FIGS. 3A and 3B, the horizontal axis indicates time and the horizontal axis indicates a horizontal direction line of the image, and the vertical axis indicates lines of the image from the bottom end to the top end in the direction of the arrow.

In FIG. 3A, 300 denotes an image capture synchronization signal that is generated by the synchronization signal generation unit 107. 301 denotes the timing of image writing performed by the memory write unit 102. The memory write unit 102 writes the image in units of lines from the top end of the image toward the bottom end of the image in accordance with the timing of the image capture synchronization signal 300. 302, which exists at a constant interval, denotes synchronization signals from the display unit 106 (hereinafter "display synchronization signal") that are generated by the synchronization signal generation unit 107. 303 denotes the timing of image readout (hereinafter "memory readout timing"). The memory readout unit 104 reads out the image in units of lines from the top end of the image toward the bottom end in accordance with the display synchronization signal 302.

In the present embodiment, in order to prevent memory readout from overtaking writing to the memory, a predetermined delay amount is applied to the timing of writing and reading out, and the readout speed is set to be less than or equal to (½ at most) the writing speed. Note that in the case in which the readout speed is faster than the writing speed, a configuration is sufficient in which a predetermined delay amount that is larger than it is in the case of the present example is applied such that reading out does not overtake writing.

304 denotes a synchronization interval, and in FIG. 3A, the image capture synchronization signal 300 and the display synchronization signal 302 occur at the same interval, but the intervals may be different. For example, in the case in which the image capture synchronization signal 300 has double the framerate of the display synchronization signal 302, the display synchronization signal 302 is generated at an interval double that of the interval for the image capture synchronization signal 300. In this case, the memory readout unit 104 may perform readouts by thinning out one frame each time from the frames written by the memory write unit 102.

305 denotes the image area in the perpendicular direction in which the memory readout unit 104 performs readout. The memory readout unit 104 performs access from the top end of the image to the bottom end in memory writing and readout.

When electronic zoom is not performed in FIG. 3A, the display synchronization signal 302 only delays timing of a predetermined delay amount compared to the image capture synchronization signal 300. By holding the relationship between timing of image readout/writing and timing of display, the display timing between image input (image capturing) by the image capturing unit 100 and output to the display unit 106 can be reduced even in cases of the memory being accessed, and therefore display delay can be mitigated, and it is guaranteed that reading out of the memory will not overtake writing to the memory due to the predetermined delay amount. By controlling the timing of readout/writing and the timing of display in this way, images can be readout from/written to the memory with the minimum required delay time.

Next is a description of a control of image readout/writing during electronic zoom in FIG. 3B. FIG. 3B is different from FIG. 3A in that the memory readout timing 303 is delayed for an amount that corresponds to one frame relative to the write timing 301, and that instead of the entire image, an area of a portion of the image is read out by enlargement processing due to electronic zoom. 310 denotes the image area in the perpendicular direction in which the memory readout unit 104 performs readout. 311 denotes the center of the enlarged area and is located at the same position as the center of the actual-size image in the present embodiment. During electronic zoom, the image displayed on the display unit 106 is an enlarged image, and therefore the area to be read out is not the entire image, but is instead a partially cut-out image. As shown in FIG. 3B, depending on the readout image area 310, there are cases in which writing of the image of the readout area is still incomplete at the timing of the display synchronization signal 302. For this reason, in the present embodiment, control is performed such that the memory readout timing 303 is delayed by an amount that corresponds to one frame relative to the write timing 301 during electronic zoom.

As shown in FIGS. 3A and 3B, the frame control unit 109 selects the VRAM 103A or the VRAM 103B as the frame memory from which the image is to be read out. In other words, the frame control unit 109 performs control such that if writing to the VRAM 103A is being performed, readout from the VRAM 103B is performed, and if writing to the VRAM 103B is being performed, readout from the VRAM 103A is performed.

In the present embodiment, in contrast to the memory write unit 102 alternatingly writing to the VRAM 103A and 103B when electronic zoom is not operating, the memory readout unit 104 reads out the frames from the VRAM 103A and 103B that are the same as those being written to the VRAM 103A and 103B by the memory write unit 102. In contrast to this, during electronic zoom the memory readout unit 104 reads out the image written to the VRAM 103A and 103B one frame prior.

Note that the timing of memory readout is not limited to one prior frame, and the image two frames prior or more, i.e., the image at least one frame prior, may be read out in the case in which consistency between frames does not largely fluctuate.

Figure 4:
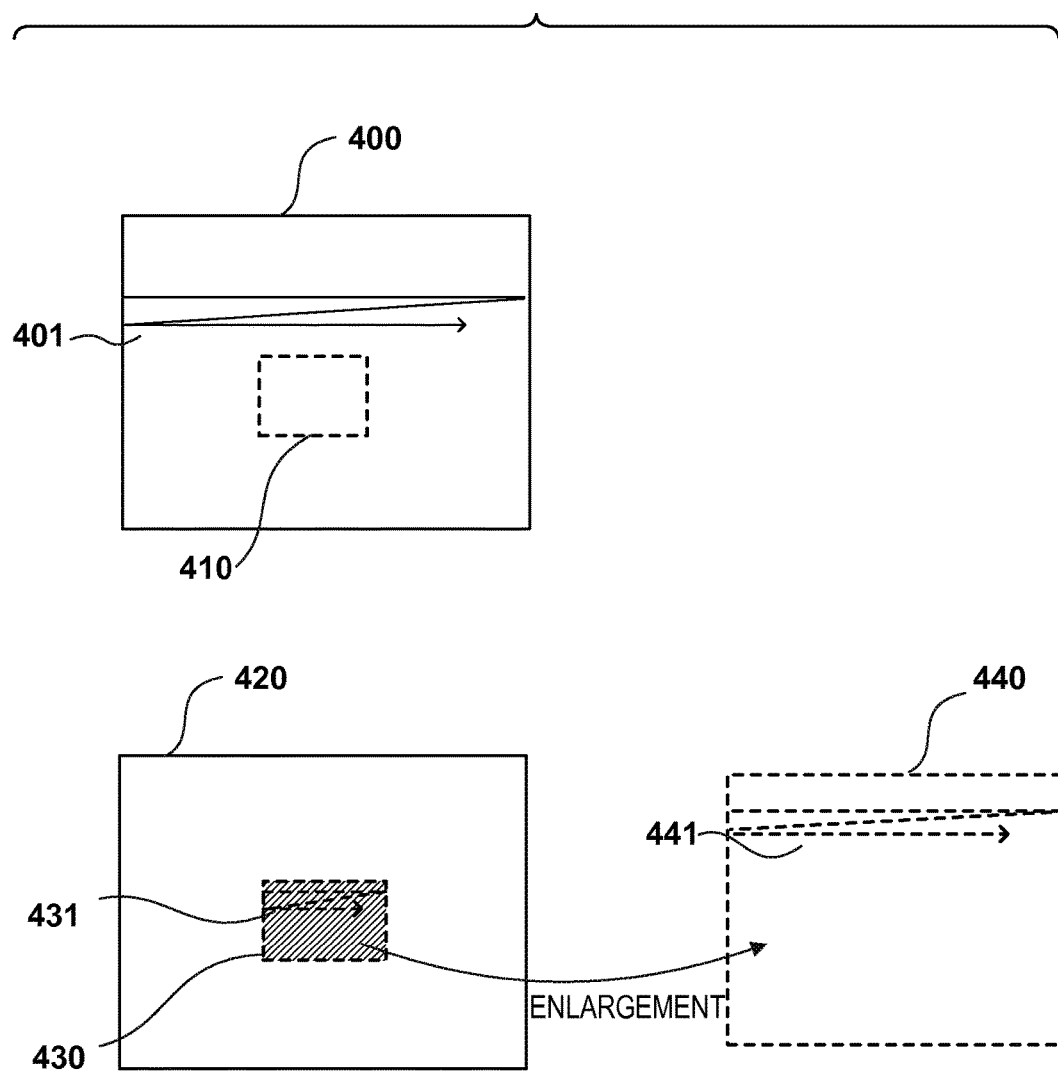
FIG. 4 is a timing chart showing writing/reading out of images during electronic zoom.

Here, the relationship between the timing of image readout/writing and the timing of display during electronic zoom will be described with reference to FIG. 4.

400 denotes an image area output by the image capturing unit 100 and written to a memory by the memory write unit 102. 401 denotes a write scan performed by the memory write unit 102, in which writing is performed using raster processing from a top end toward a bottom end. 410 denotes an image area read out by the memory readout unit 104 and denotes a portion of the image area read out from a memory that is the same as the memory to which the image area was written. 420 denotes an image area of one frame prior, 430 denotes an enlarged area of the image, and 431 denotes a readout scan by the memory readout unit 104. 440 denotes an image displayed on the display unit 106. 441 denotes a display scan performed by the display unit 106, in which in which raster processing is performed similarly as it is in the write scan 401. The image resizing unit 105 performs processing to enlarge the image size of the enlarged area 430, which is read out from the image area 420 of one frame prior, to the size of the display image 440.

As described in FIG. 2, there is a need for the display scan 441 to perform display processing at an image size and rate stipulated by the display device. As shown in FIG. 4, the sizes of the readout area 430 and the display image 440 differ during electronic zoom, and therefore the rate for the readout scan 431 and the display scan 441 are different from each other. As described in FIG. 3B, the start timing of the readout scan 431 is the same as that of the display scan 441, but the readout speed for the readout scan 431 is slow. For this reason, there are cases in which the write scan 401 has not yet been performed on the readout image area 410. For this reason, as shown in FIG. 3B and FIG. 4, in the present embodiment the readout scan 431 is performed from the image area 420 of one frame prior. In this way, by switching the memory to be read out according to the presence or absence of electronic zoom, the timing of writing and reading out of an image is stabilized, and therefore stable display can be performed while also mitigating display delay.

Here, the relationship between the timing of image readout/writing and the enlargement ratio of the image during electronic zoom will be described with reference to FIG. 5.

In FIG. 5, the uppermost field indicates the frame number of the image written (write image) by the memory write unit 102. The second field indicates the memory to which the image is written as being the VRAM 103A or the VRAM 103B. The third and fourth fields indicate the frame number of the image read out (readout image) by the memory readout unit 104, and the memory from which the image is read out. The lowermost field shows the image enlargement ratio that is controlled by the resize control unit 108.

As shown in FIG. 5, from frame number 0 to 9 of the write images, the image of the same frame as the write image is read out and the enlargement ratio (actual size) is 1.0. If electronic zoom starts at the point at which the write image frame number is 10, the image of the frame prior to the write image is read out, and therefore the readout image frame number is 9 and the VRAM 103B is the memory area. On the other hand, the image enlargement ratio is controlled independently regardless of image writing and readouts. In the present embodiment, when the write image frame number is 10, the enlargement ratio is changed to 1.1, and the image enlargement ratio for the next frame, which is frame number 11, is 1.2. As shown in FIG. 3, upon electronic zoom starting, the readout image with a frame number 9 is read out twice consecutively from the VRAM 103B and output to the display unit 106, but the enlargement ratio of the image changes at a constant ratio of 0.1. As such, by performing control such that the time variation of the zoom magnification is maintained regardless of switching between frame memories for the readout image, smooth zoom control is achieved and a display with little sense of incongruity is possible.

Second Embodiment

Next, a second embodiment will be described with reference to FIGS. 6A, 6B and 8.

In the first embodiment, the frame memory for a readout image is switched depending on the presence or absence of electronic zoom. In contrast to this, in the second embodiment, there is a switch between setting the readout image to be the frame image that is the same as the write image or setting the readout image to be the image of one frame prior to the write image according to the zoom magnification for the electronic zoom and the location of the zoom area. In the first embodiment, the control method was performed with the idea of setting the delay display to the minimum delay amount electronic zoom is not performed, but in the second embodiment, the control method is one in which even during electronic zoom, the readout image and the write image are set as the same frame up until the zoom magnification with which readout is possible without reading out overtaking writing by using a predetermined display delay amount.

Note that the configuration of the apparatus in the present embodiment is the same as that in FIG. 1, and therefore its description is omitted.

Figure 6A:
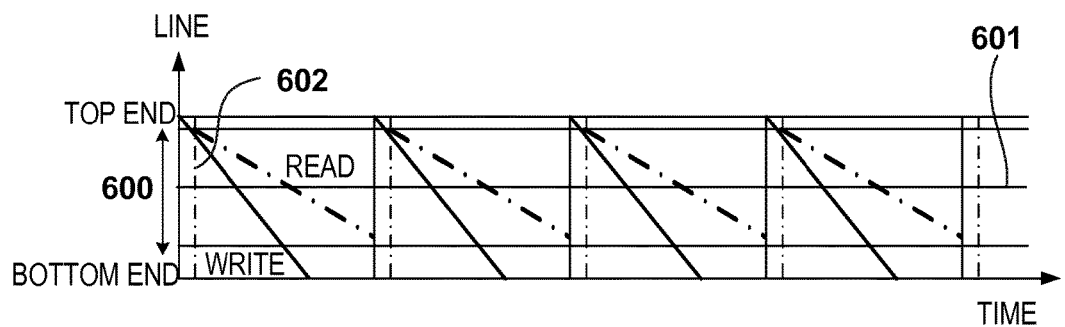
FIGS. 6A and 6B are timing charts showing writing/reading out of images during electronic zoom according to a second embodiment.

In FIG. 6A, enlargement processing is performed by electronic zoom, but the case is a case in which the frame for the readout image and the write image are the same, and 600 denotes the image area in the perpendicular direction of the readout image, and 601 denotes the center of the enlargement area. In FIG. 6A, the enlargement ratio for the images is approximately the actual size, and the center of the enlargement area is also located near the center of the actual-size image. In this case, the readout start position is a position near the top end of the image. At the timing of a display synchronization signal 602, writing of the image is already complete at the readout start position of the same frame, and therefore it is possible to readout the image of the frame that is the same as that of the write image.

Figure 6B:
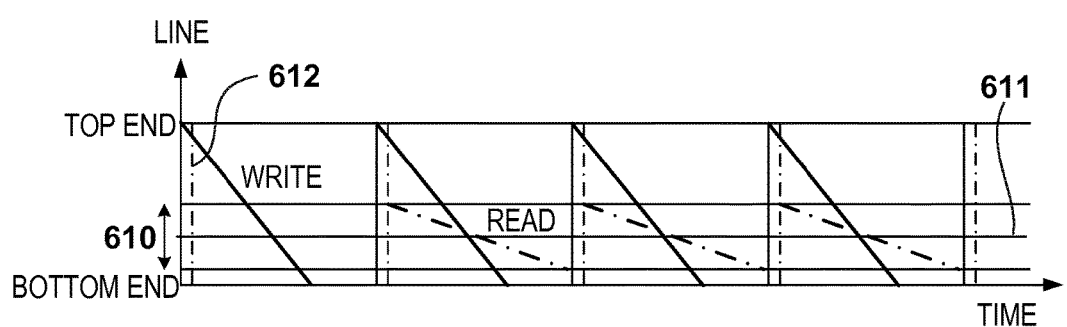

In FIG. 6B, enlargement processing is performed by electronic zoom, but the case is a case in which the readout image is that of one frame prior to the write image, and 610 denotes image area in the perpendicular direction of the readout image, and 611 denotes the center of the enlargement area. In FIG. 6B, the enlargement ratio is comparatively large, and the center of the enlargement area is also located near the bottom end of the actual-size image. In this case, writing of the image is still incomplete at the readout start position of the same frame at the timing of a display synchronization signal 612, and therefore the image of the frame that is the same as the write image cannot be read out. For this reason, control is performed such that the readout image is delayed by an amount that corresponds to one frame relative to the write image.

As understood from FIGS. 6A and 6B, the readout start position for an image differs even in the same frame according to the enlargement ratio and enlargement area position due to electronic zoom. The frame control unit 109 switches between setting the readout image to that of one frame prior to the write image or setting the same frame for the readout image and the write image based on the timing of the display synchronization signal and the readout start position for the image described above.

Next, the relationship between the timing of image readout/writing and the image enlargement ratio during electronic zoom in the second embodiment will be described with reference to FIGS. 7 and 8.

FIG. 7 indicates the case of the zoom-in direction, and FIG. 8 indicates the case of the zoom-out direction, and in the present embodiment, control is performed in which hysteresis is applied to switching the frame for the readout image in the zoom-in direction and the zoom-out direction. The upper, middle, and lower fields are the same as FIG. 3.

In the zoom-in direction shown in FIG. 7, from write image frame numbers 0 to 9, the image of the same frame as the write image is read out, and the enlargement ratio also changes at a constant ratio from 1.0 (actual size). At the point in which the write image frame number is 10 and the enlargement ratio is 2.0, the position of the enlargement area relative to the actual-size image is in the positional relationship shown in FIG. 6B, and writing of the image at the readout start position for the same frame is incomplete and the predetermined display delay amount cannot be satisfied, and therefore the frame control unit 109 switches the readout image to the image of one frame prior. Accordingly, the readout image frame number is 9 of the VRAM 103B. Meanwhile, the enlargement ratio is controlled regardless of writing and readout of the image. Note that in the present embodiment, the enlargement ratio is 2.0 when the write image frame number is 10, and the enlargement ratio for the next frame, which is frame number 11, is 2.1. In this way, similarly to the first embodiment, smooth zoom control is achieved by changing the zoom magnification for electronic zoom at a constant ratio, and a display with little sense of incongruity is possible.

Also, in the zoom-out direction shown in FIG. 8, which is opposite to the zoom-in direction, from write image frame numbers 0 to 9, the image of one frame prior to the write image is read out such that the predetermined display delay is satisfied. Also, at the point in which the write image frame number is 10 and the enlargement ratio is 1.5, the writing of the image at the readout start position for the same frame will be complete within the scope of the predetermined delay amount, and therefore the frame control unit 109 sets the frame for the readout image to the same frame as the write image, and performs a switch such that the number 10 frame for the readout image is read out from the VRAM 103A. Note that the enlargement ratio is controlled such that it changes at a constant ratio, similarly to FIG. 7.

As such, the frame control unit 109 performs control such that the timing of switching the frame for the readout image in the zoom-in direction and the zoom-out direction changes according to the enlargement ratio and enlargement area due to electronic zoom. Accordingly, even in cases in which zoom-in and zoom-out are repeated at the enlargement ratio in the vicinity of the timing of frame switching, switching of frames for the readout image does not occur frequently, and a display with little sense of incongruity is possible.

As described above, according to the present embodiment, by switching the frame for the readout image according to the zoom magnification and the zoom area for electronic zoom so as to satisfy the predetermined display delay amount, the timing of writing and reading out of the image is stabilized, and therefore stable display can be performed while also mitigating display delay. Also, according to the present embodiment, control can performed such that readout and writing are performed on the same frame up until a predetermined zoom magnification is reached even during electronic zoom, and therefore the mitigation effect for the delay display can be applied to a broader scope than the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-231049, filed Nov. 13, 2014 which is hereby incorporated by reference herein in its entirety.

What is claimed is:

1. An image capturing apparatus, comprising:
an image capturing unit;
a memory configured to store image data that is output at a predetermined frame rate from the image capturing unit;
one or more processors or circuits that function as:
  a writing unit configured to write the image data to the memory;
  a readout unit configured to read out the image data stored in the memory; and
  a control unit configured to:
    control reading out of the image data by the readout unit,
    perform control such that a frame of image data read out by the readout unit differs between when electronic zoom is operating and when electronic zoom is not operating,
    perform, when electronic zoom is not operating, a first control in which the readout unit reads out image data of a frame that is the same as a frame for which the writing unit is writing image data, and
    perform, when electronic zoom is operating, a second control in which image data that was written to the memory at least one frame prior is read out; and
a display configured to display an image based on the image data read out by the readout unit.

2. An image capturing apparatus, comprising:
an image capturing unit;
a memory configured to store image data that is output at a predetermined frame rate from the image capturing unit;

one or more processors or circuits that function as:
a writing unit configured to write the image data to the memory;
a readout unit configured to read out the image data stored in the memory; and
a control unit configured to control reading out of the image data by the readout unit, and to perform control such that a frame of image data read out by the readout unit differs between when electronic zoom is operating and when electronic zoom is not operating, and
a display configured to display an image based on the image data read out by the readout unit;
wherein the memory has a plurality of memories for the writing unit to write image data for each frame, and
the control unit is configured to perform control such that the writing unit switches the memory for each frame and writes the image data.

3. The apparatus according to claim 1, wherein the one or more processors or circuits further function as:
a zoom unit configured to change a size of an image to be displayed by the display;
an image resizing unit configured to generate image data for an image that is resized according to a zoom magnification for electronic zoom; and
a resize control unit configured to, when the control unit is performing the second control when electronic zoom is operating, change a zoom magnification at a predetermined ratio for each frame until a zoom magnification set by the zoom unit is reached.

4. The image capturing apparatus according to claim 3, wherein the resize control unit performs control such that a portion of data is read out from the image data stored in the memory by the readout unit in accordance with the zoom magnification.

5. The image capturing apparatus according to claim 1, wherein the one or more processors or circuits further function as:
a signal generating unit configured to generate a signal for synchronizing, with a predetermined delay amount, a timing of writing of image data by the writing unit and a timing of reading out of image data by the readout unit.

6. An image capturing apparatus, comprising:
an image capturing unit;
a memory configured to store image data that is output at a predetermined frame rate from the image capturing unit;
one or more processors or circuits that function as:
a writing unit configured to write the image data to the memory;
a readout unit configured to read out the image data stored in the memory; and
a control unit configured to control reading out of the image data by the reading out unit, to make a frame of image data read out from the memory different in accordance with a zoom magnification and a zoom area position when electronic zoom is operating, and to switch between performing a first control in which the readout unit reads out image data of a frame that is the same as a frame for which the writing unit is writing image data, and performing a second control in which image data that was written to the memory at least one frame prior is read out, in accordance with the zoom magnification and the zoom area position; and
a display configured to display an image based on the image data read out by the readout unit.

7. The image capturing apparatus according to claim 6, wherein the control unit changes a timing of switching of the first control and the second control between a zoom-in direction and a zoom-out direction of electronic zoom.

8. An image capturing apparatus, comprising:
an image capturing unit;
a memory configured to store image data that is output at a predetermined frame rate from the image capturing unit;
one or more processors or circuits that function as:
a writing unit configured to write the image data to the memory;
a readout unit configured to read out the image data stored in the memory; and
a control unit configured to control reading out of the image data by the reading out unit, to make a frame of image data read out from the memory different in accordance with a zoom magnification and a zoom area position when electronic zoom is operating; and
a display configured to display an image based on the image data read out by the readout unit;
wherein the memory has a plurality of memories for the writing unit to write image data for each frame, and
the control unit is configured to perform control such that the writing unit switches the memory for each frame and writes the image data.

9. An image capturing apparatus, comprising:
an image capturing unit;
a memory configured to store image data that is output at a predetermined frame rate from the image capturing unit;
one or more processors or circuits that function as:
a writing unit configured to write the image data to the memory;
a readout unit configured to read out the image data stored in the memory;
a control unit configured to control reading out of the image data by the reading out unit, to make a frame of image data read out from the memory different in accordance with a zoom magnification and a zoom area position when electronic zoom is operating;
a zoom unit configured to change a size of an image to be displayed by a display;
an image resizing unit configured to generate image data for an image that is resized according to a zoom magnification for electronic zoom; and
a resize control unit configured to, when the control unit is performing the second control when electronic zoom is operating, change a zoom magnification at a predetermined ratio for each frame until a zoom magnification ratio set by the zoom unit is reached; and
the display configured to display the image based on the image data read out by the readout unit.

10. An image capturing apparatus, comprising:
an image capturing unit;
a memory configured to store image data that is output at a predetermined frame rate from the image capturing unit;
one or more processors or circuits that function as:
a writing unit configured to write the image data to the memory;
a readout unit configured to read out the image data stored in the memory;

a control unit configured to control reading out of the image data by the reading out unit, to make a frame of image data read out from the memory different in accordance with a zoom magnification and a zoom area position when electronic zoom is operating,
a zoom unit configured to change a size of an image to be displayed by a display;
an image resizing unit configured to generate image data for an image that is resized according to a zoom magnification for electronic zoom; and
a resize control unit configured to, when the control unit is performing the second control when electronic zoom is operating, change a zoom magnification at a predetermined ratio for each frame until a zoom magnification ratio set by the zoom unit is reached, and to perform control such that a portion of data is read out from the image data stored in the memory by the readout unit in accordance with the zoom magnification; and
the display configured to display the image based on the image data read out by the readout unit.

11. The image capturing apparatus according to claim 6, wherein the one or more processors or circuits further function as a signal generating unit configured to generate a signal for synchronizing, with a predetermined delay amount, a timing of writing of image data by the writing unit and a timing of reading out of image data by the readout unit.

12. A control method of an image capturing apparatus which has an image capturing unit; a memory configured to store image data that is output at a predetermined frame rate from the image capturing unit; one or more processors or circuits that function as a writing unit configured to write the image data to the memory; and a readout unit configured to read out the image data stored in the memory; and further having a display configured to display an image based on the image data read out by the readout unit, the method comprising:
a control step of controlling reading out of the image data by the readout unit, controlling reading out so that a frame of image data read out by the readout unit differs between when electronic zoom is operating and when electronic zoom is not operating, and performing, when electronic zoom is not operating, a first control in which the readout unit reads out image data of a frame that is the same as a frame for which the writing unit is writing image data, and performing, when electronic zoom is operating, a second control in which image data that was written to the memory at least one frame prior is read out.

13. A control method of an image capturing apparatus which has an image capturing unit; a memory configured to store image data that is output at a predetermined frame rate from the image capturing unit; one or more processors or circuits that function as: a writing unit configured to write the image data to the memory; a readout unit configured to read out the image data stored in the memory; and further having a display configured to display an image based on the image data read out by the readout unit, the method comprising:
a control step of controlling reading out of the image data by the readout unit, making a frame of image data read out from the memory different in accordance with a zoom magnification and a zoom area position when electronic zoom is operating; and controlling, when electronic zoom is not operating, the readout unit so that reading out starts in a frame period that is the same as that of writing of the image data, and controlling, when electronic zoom is operating, the readout unit so that reading out starts after being delayed by at least one frame period from writing of the image data.

* * * * *